(12) United States Patent
Rhelimi

(10) Patent No.: US 10,116,654 B2
(45) Date of Patent: Oct. 30, 2018

(54) METHOD FOR CLONING A SECURE ELEMENT

(71) Applicant: GEMALTO SA, Meudon (FR)

(72) Inventor: Alain Rhelimi, Meudon (FR)

(73) Assignee: GEMALTO SA, Meudon (FR)

( * ) Notice: Subject to any disclaimer, the term of this patent is extended or adjusted under 35 U.S.C. 154(b) by 34 days.

(21) Appl. No.: 14/424,234

(22) PCT Filed: Sep. 3, 2013

(86) PCT No.: PCT/EP2013/068147
§ 371 (c)(1),
(2) Date: Feb. 26, 2015

(87) PCT Pub. No.: WO2014/037330
PCT Pub. Date: Mar. 13, 2014

(65) Prior Publication Data
US 2015/0215311 A1    Jul. 30, 2015

(30) Foreign Application Priority Data
Sep. 6, 2012  (EP) .................................... 12306066

(51) Int. Cl.
| H04L 29/06 | (2006.01) |
| H04W 12/06 | (2009.01) |
| H04W 12/04 | (2009.01) |
| G06F 21/32 | (2013.01) |

(Continued)

(52) U.S. Cl.
CPC .......... *H04L 63/0853* (2013.01); *G06F 21/32* (2013.01); *G06F 21/34* (2013.01); *G06F 21/44* (2013.01); *G06F 21/445* (2013.01); *H04L 63/0861* (2013.01); *H04W 12/04* (2013.01); *H04W 12/06* (2013.01); *G06F 2221/2115* (2013.01)

(58) Field of Classification Search
CPC . H04L 63/0853; H04L 63/0861; G06F 21/32; G06F 21/34; H04W 12/16
See application file for complete search history.

(56) References Cited

U.S. PATENT DOCUMENTS

| 2005/0239440 A1 | 10/2005 | Chen et al. |
| 2007/0118875 A1* | 5/2007 | Chow ................ H04L 63/0807 726/2 |

(Continued)

FOREIGN PATENT DOCUMENTS

| EP | 2469485 A1 * | 6/2012 | ........... G07F 7/1008 |

OTHER PUBLICATIONS

International Search Report and Written Opinion dated Oct. 4, 2013 for corresponding International Patent Application No. PCT/EP2013/068147, filed on Sep. 3, 2013.

*Primary Examiner* — Hadi S Armouche
*Assistant Examiner* — Alexander R Lapian
(74) *Attorney, Agent, or Firm* — The Jansson Firm; Pehr Jansson

(57) ABSTRACT

The invention proposes a method for cloning a first secure element from a backup secure element of a user, said backup secure element comprising at least credentials of said user. The method comprises a preliminary phase of checking the authenticity of the first secure element using a second secure element, said second secure element being able to be paired with a third secure element.

12 Claims, 1 Drawing Sheet

(51) Int. Cl.
    *G06F 21/34*          (2013.01)
    *G06F 21/44*          (2013.01)

(56) References Cited

U.S. PATENT DOCUMENTS

| | | | |
|---|---|---|---|
| 2009/0307140 A1* | 12/2009 | Mardikar | G06Q 20/1085 705/71 |
| 2011/0091040 A1* | 4/2011 | Krysiak | G06Q 20/3558 380/283 |
| 2012/0117635 A1 | 5/2012 | Schell et al. | |
| 2012/0133605 A1* | 5/2012 | Tanaka | H04B 13/005 345/173 |
| 2012/0190354 A1* | 7/2012 | Merrien | H04W 4/001 455/422.1 |
| 2012/0240195 A1* | 9/2012 | Weiss | H04L 63/0846 726/4 |
| 2012/0304255 A1* | 11/2012 | Carnes | H04L 9/3234 726/3 |
| 2013/0205377 A1* | 8/2013 | Cheng | H04L 63/0861 726/7 |

\* cited by examiner local remote

METHOD FOR CLONING A SECURE ELEMENT

FIELD OF THE INVENTION

The present invention relates generally to secure elements and more specifically to a method for cloning secure elements.

BACKGROUND OF THE INVENTION

An eGo device relies on the eGo technology combining two wireless technologies and a secure element. The two wireless technologies are, for example, Body-Coupling Communication (a.k.a BCC) with a very short operational range allows to unambiguously select the device to connect with and the Ultra-Wide Band (UWB) with RTLS (Real Time Location Service)/basic distance measurement with a medium operational range allows a high-speed exchange for application data into a secure element. For using the eGo secure elements, a first step consist in securely pairing two eGo devices and bootstraping the UWB communication. A second step consists in starting an application via a fast and secure wireless point-to-point communication and monitoring the distance between the two devices to control an operational and secure application bubble. The eGo secure element can be a dedicated component or embedded in a System On Chip. The eGo secure element has a means to check the authenticity and the integrity of the eGo technology related subsystems integrated within the eGo device.

Security access codes are required as the eGo device is personalized at least with a user's credentials and access rights. Then for using such credentials and access rights, the user has a device comprising such eGo secure element or having same functions as the eGo secure element on his or her person, such as a watch or other wearable item containing a secure element. If authorized, the user when touching a secured door also equipped with the eGo technology has access via an Ultra Wide Band transmitter/receiver. Thanks to such eGo secure devices a user has just to touch a device to authenticate herself.

Nevertheless a problem may occur if a user purchases a new eGo device containing a blank eGo secure element and wants to clone it. Indeed he has no clue about the authenticity of said secure element wherever he purchased it. There is then a need for a method for cloning such secure elements from an initialized secure element in a trusted and secured way.

SUMMARY OF THE INVENTION

It is then an object of the invention to provide a method for cloning a blank eGo secure element from an initialized eGo secure element.

Thereto, the present invention provides a method for cloning a first secure element from a backup secure element of a user, said backup secure element comprising at least credentials of said user, characterized in that it comprises a preliminary phase of checking the authenticity of the first secure element using a second secure element, said second secure element being able to be paired with a third secure element.

According to another aspect of the invention, the preliminary phase may comprise a step of activating the first secure element and capturing a biometric data of the user.

According to another aspect of the invention, the preliminary phase may comprise a step of detecting the first secure element and transferring pairing data between the first and the second secure elements so that said first and second elements are able to communicate directly.

According to another aspect of the invention, the preliminary phase may comprise a step of authenticating the first secure element by the second secure element using a biometric means.

According to another aspect of the invention, the preliminary phase may comprise a step of establishing a secure communication channel between the first and the second secure elements.

According to another aspect of the invention, the preliminary step may comprise informing the user on the authenticity of the first secure element.

According to another aspect of the invention, the method may comprise remotely processing the preliminary phase of checking the authenticity of the first secure element.

According to another aspect of the invention, the method may comprise requesting an activation of the second secure element by a trusted user, a pairing of said second secure element with the third secure element, said third secure element being connected to the network, an identification data.

According to another aspect of the invention, the method may comprise activating and connecting the first secure element to the network via a fourth secure element, said fourth secure element being able to be securely paired with the first secure element.

According to another aspect of the invention, the method may comprise sending identification data of the user and identification of the trusted user to the network so that to pair the first secure element and the second secure element establishing a secure communication channel between said first and second secure elements.

According to another aspect of the invention, the preliminary phase may comprise using a secure element of a trusted user as second secure element.

According to another aspect of the invention, the preliminary phase may comprise using the backup element of the user as second secure element.

According to another aspect of the invention, the preliminary phase may comprise using the backup element of the user as second secure element and further comprising a step of preregistering biometric data of the trusted user on the second secure element.

According to another aspect of the invention, the method may comprise a cloning phase wherein it comprises initiating the cloning of said credentials from the backup secure device to the first secure element after a two-factor authentication is successful.

According to another aspect of the invention, the method may comprise processing the cloning phase locally and using the backup secure element of the user for the two-factor authentication.

According to another aspect of the invention, the method may comprise establishing a secure channel between the first secure element and the backup secure element.

According to another aspect of the invention, the cloning phase may comprise capturing biometric data of the user on the first secure element and the backup secure element, transferring said biometric data captured on the first secure element to the backup secure element and authorizing the cloning if said biometric data match.

According to another aspect of the invention, the method may comprise processing the cloning phase locally and using a secure element of a second trusted user for the Two-factor authentication.

According to another aspect of the invention, the method may comprise preregistering biometric data of the user on the secure element of said second trusted user before processing the cloning phase.

According to another aspect of the invention, the method may comprise establishing a secure communication channel between the first secure element and the secure element of the second trusted user.

According to another aspect of the invention, the cloning step may comprise capturing biometric data of the user on the first secure element and the secure element of said second trusted user, and in that it may further comprise the step of authorizing the cloning of the credentials of the backup secure element of the user into the first secure element if biometric data captured on the first secure element match with biometric data preregistered in the secure element of the second trusted user.

According to another aspect of the invention, the method may comprise processing the cloning phase remotely, wherein the backup secure element of the user for the Two-factor authentication is a remote secure element.

According to another aspect of the invention, the method may comprise preregistering biometric data of a second trusted user on the backup secure element of the user before processing the cloning phase.

According to another aspect of the invention, the method may comprise requesting an activation of the backup secure element by said second trusted user, an identification data of said second trusted user, a remote pairing of said backup secure element with the first secure element.

According to another aspect of the invention, the method may comprise capturing biometric data of the user on the first secure element, transferring said biometric data to the remote backup secure element, and authorizing the cloning if biometric data match.

Thanks to the invention, the use of fingerprints database which may be prohibited by law is advantageously avoided.

The invention provides advantageously a method to authenticate a blank eGo device in an unknown environment.

BRIEF DESCRIPTION OF THE DRAWINGS

The various aspects, features and advantages of the invention will become more fully apparent to those having ordinary skill in the art upon careful consideration of the following Detailed Description, given by way of example thereof, with the accompanying drawings described below.

DETAILED DESCRIPTION

The present invention may be understood according to the detailed description provided herein.

Figure 1:
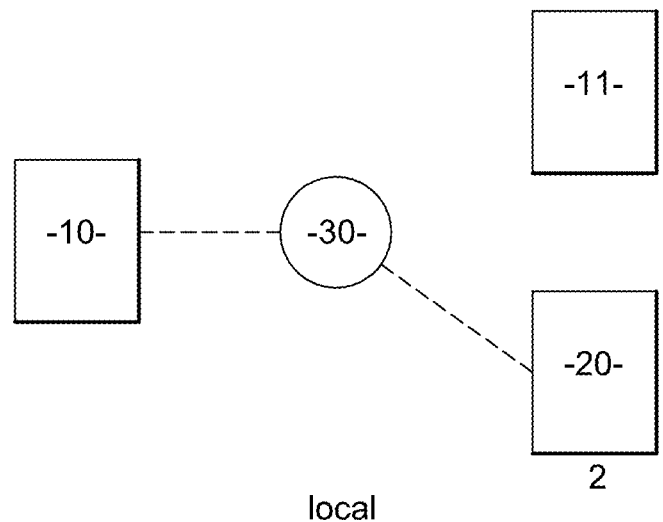
FIG. 1 schematically shows an embodiment of the preliminary phase according to the invention.

Shown in FIG. 1 is a user 1 who has purchased out off the shelf first device containing a secure element 10. The first device is an eGo device containing a blank secure element.

The first secure element 10 of the first device is then compliant with the eGo technology as described in the above description and thus is able to communicate to another secure element using the same technology, for example, a secure element located in another eGo device.

A backup secure element 11 comprises at least credentials of the user 1 and access rights associated to the user 1. The backup secure element 11 is a secure element comprised in an eGo device and which comprises at least credentials of the user 1 and access rights associated to the user 1. The backup secure element 11 is able to be securely paired to a third secure element 30.

A method for cloning data from the backup secure element 11 into the first secure element 10, i.e. transferring the at least credentials and access rights of the user 1 comprises two main phases: a preliminary phase of checking the authenticity of the first secure element 10 wherein the user is able to determine the authenticity of the first secure element 10 as the user 1 has no clue about the authenticity of this first secure element 10, and a cloning phase wherein the at least credentials are effectively transferred from the backup secure element 11 into the first secure element 10.

The preliminary phase and the cloning phase can be made either locally or remotely. In the following description, different embodiments for processing these phases locally or remotely will be described separately. It will be well understood that when possible a local preliminary phase can also be combined with a remote cloning phase, or a remote preliminary phase can also be combined with a local cloning phase, . . . .

According to a first embodiment of the invention, the method comprises a preliminary phase of checking the authenticity of the first secure element 10 using a second secure element 20. In this first embodiment, the preliminary phase comprises using a secure element of a trusted user as second secure element 20. The second secure element 20 then belongs to a trusted user 2 like a friend, and is also able to be paired with the third secure element 30 of same type. The second secure element 20 is an authenticated secure element.

The preliminary phase comprises a step P1 of activating the first secure element 10 and capturing a biometric data of the user 1 such as a fingerprint before pairing the first and the second secure element 10, 20 with the third secure element 30.

It will be well understood in all the specification that a fingerprint is not a limitated example and that any other biometric data suitable for the present invention can be used. For pairing the first secure element 10 and the second secure element 20 with the third secure element 30, the user 1 and the trusted user 2 for example touch together an eGo device containing the third secure element 30. The third secure element 30 is equipped with means for enabling the authentication and the pairing and is for example a secure element contained in a mouse called "eGo-ready mouse" in the following description.

The preliminary phase further comprises a step P2 of detecting the first secure element 10 and transferring pairing data between the first and the second secure element 10, 20 so that the first secure element 10 and the second secure element 20 are able to communicate directly. The eGo-ready mouse 30 detects the blank secure element 10 and pairing data are transferred between the two secure elements 10, 20 in such a way that the secure elements 10, 20 can communicate directly together.

The preliminary phase further comprises a step P3 of authenticating the first secure element 10 by the second secure element 20. The customized and trustable eGo secure element 20 authenticates the blank eGo secure element 10.

The preliminary phase further comprises a step P5 of establishing a secure communication channel between the first and the second secure elements 10, 20. Once established, the preliminary phase comprises a step P6 of informing the user 1 on the authenticity of the first secure element 10. The secure channel is established between the two eGo secure elements 10, 20 allowing the transfer of settings enabling the step P6 wherein the user is able to determine the authenticity of the blank first secure element 10. To inform the user about the authenticity of the blank eGo element, the first and the second devices that contain secure elements 10, 20 comprise means for indicating the success or the failure of the preliminary phase. Such means are for example a LED securely controlled by each secure element 10, 20. The LEDs of the two eGo devices for example blink synchronously by using a same colour when the authentication is successful and blink using a different colour when the authentication fails.

It will be understood that such means are not limited examples and other means either visual means, e.g. direct visual means or via a webcam, or sound's means are possible.

An asynchronous blinking using same colour may also be used for informing about a failure of the preliminary phase.

In another embodiment, the three secure elements have a means to measure the distance between each of them by using the UWB technology and the SDS-TWR (Symmetric Double-Sided Two-Way Ranging) principle as described in the IEEE802.15.4a. The equivalent triangle defines by three corners as the blank eGo device, the initiated eGo device and the eGo ready mouse shall be consistant, i.e. less than 1.5 m per edge. This embodiment allows improving the security checking against fake blank eGo device transmitting verbatim the data to a distant and spied authentic blank eGo device.

In another embodiment, the preliminary phase comprises using the backup element 11 of the user 1 as second secure element 20. Then the second secure element 20 is the backup secure element 11 of the user himself.

In this embodiment the authenticity checking preliminary phase can advantageously be done either by using a secure element of a friend or trusted person or with the secure element to be cloned.

Figure 2:
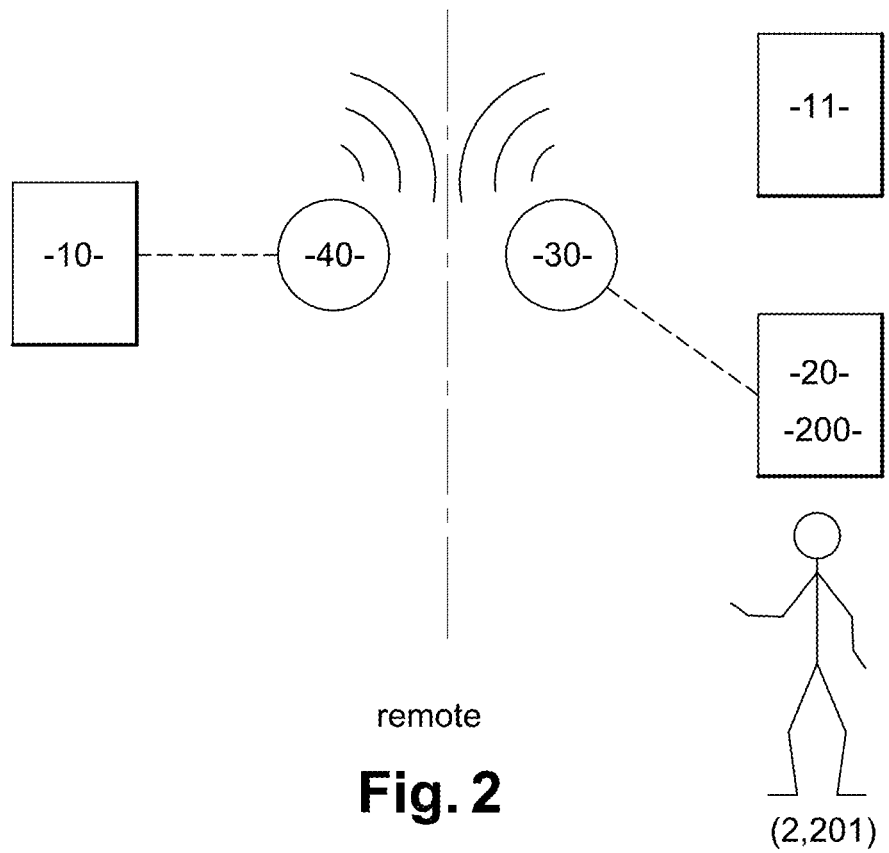
FIG. 2 schematically shows an embodiment of the preliminary phase according to the invention

In another embodiment, the method comprises remotely processing the preliminary phase of checking the authenticity of the first secure element 10 as shown in FIG. 2.

For doing so, the method comprises requesting an activation of the second secure element 20 by the trusted user, a pairing of said second secure element 20 with the third secure element 30, said third secure element 30 being connected to the network, an identification data of said trusted user.

A first step of the identification can be performed by using an email address and a second step of the identification may use a second way of communication such as a user's mobile phone or the mobile phone of a friend. The first step of identification can also be performed by using a phone number. The server may challenge vocally the user to check her authenticity (e.g. Birthday of her mother, . . . ).

The method comprises activating and connecting the first secure element 10 to the network, then securely pairing a fourth secure element 40 with the first secure element 10.

In this embodiment, the second secure element 20 and the third secure element 30 are used by a trusted friend who is far from the user 1.

The user 1 for example contacts by mobile phone her friend and requests her to activate the second secure element 20, to touch a device that contains the third secure element 30 such as an eGo-ready mouse of a computer connected to the network.

An identification data is also required for identification within a secure element database such as the eGo ecosystem URI (Uniform Resource Identifier). The registration and the initialization of the connection between the eGo devices via the network is for example performed by using SIP (Session Initialization Protocol) as defined in the RFC3261 standard. After its activation, if the eGo device that contains the second secure element 20 is connected to the network, i.e. internet, then it will perform a registration of its IP address and its SIP URI (Uniform Resource Identifier). The SIP URI is similar as the user's email but prefixed with "sip:" as "sip:user@domain.com" to a SIP registrar.

Any eGo device may contact the SIP registrar for prompting (INVIT) another eGo device for a peer-to-peer communication. If the invitation is successful then the two eGo devices get the means (IP address) for a direct connection, i.e. a peer-to-peer connection. Other protocols offering the same capability are possible as for example XMPP (a.k.a Jabber): Extensible Messaging and Presence Protocol.

The user 1 then touches a device that contains the fourth secure element 40 such as an eGo-ready mouse of a computer connected to the network. A wizard pops up on the computer displays a form to fill. Each user's email address may be used to build a SIP URI allowing the registration of the eGo device to a SIP registrar.

The method further comprises sending identification data of the user and identification of the trusted user to the network so as to pair the first secure element 10 and the second secure element 20, establishing a secure communication channel between said first and second secure elements 10, 20. The connections and identification data are for example based on the SIP or XMPP protocol.

A secure channel is then established between the two secure elements 10, 20 allowing the transfer of settings enabling the step P6 as described above, allowing the user 1 to be informed on the authenticity of the first secure element 10.

The friend of the user for example informs the user 1 when the LED is ON and OFF and what the colour of the LED is on the second secure element 20.

In another embodiment the remote preliminary phase comprises using the backup element 11 of the user 1 as second secure element 20. The second secure element 20 used by the friend is the backup secure element 11 of the user 1. When doing do, the remote preliminary phase further comprises a step of preregistering biometric data of the trusted user 2 on the second secure element 20. Thus the friend 2 can activate the backup element 11 remotely as he can be recognised as being the backup secure element 11. The friend enters the email address of the user. This email address is used for building the SIP URI of the backup secure element 11. Then the backup secure element 11 is registered on the SIP registrar and can be contacted anytime until the backup secure element 11 is plugged on the network.

After the preliminary phase either processed locally or remotely, i.e. after the authenticity of the first secure element 10 is checked, the method comprises initiating the cloning of said authentication data, i.e. the credentials, from the backup secure device 11 to the first secure element 10 after a two-factor authentication is successful.

According to an embodiment, the cloning phase is processed locally and the method comprises using the backup secure element 11 of the user for the Two-factor authentication.

The backup secure element 11 is not remote but in hands of the user 1. The cloning phase comprises establishing a secure channel between the first secure element 10 and the backup secure element 11.

The user 1 for example activates the blank first secure element 10 and captures biometric data such as her fingerprint. The user also activates the backup secure element 11, and also captures biometric data, for example her fingerprint. The user 1 then touches a device that contains the third secure element 30 such as the eGo-ready mouse used in the preliminary phase. It will be well understood that any other secure element having same functions as the third secure element 30 can be used.

The first secure elements 10 and backup secure element 11 are paired with the third secure element 30. The secure element 30 of the eGo-ready mouse detects the blank first secure element 10 and transfers the pairing data between the two secure elements 10, 11 in such a way that the first secure element 10 and the second secure element 11 can communicate directly together.

The backup secure element 11 authenticates the blank first secure element 10. A secure channel is established between the first secure element 10 and the backup secure element 11. The cloning phase then comprises capturing biometric data of the user on the first secure element 10 and the backup secure element 11, transferring biometric data captured on the first secure element 10 to the backup secure element 11 and authorizing the cloning if said biometric data match. A fingerprint minutia is for example captured on the blank first secure element 10 and is transferred to the backup secure element 11. If the fingerprint transferred matches with the preregistered fingerprint, i.e. successful then the two authentication factors is valid and the blank first secure element gets from the backup secure element the essential digital credentials to allow the connection to a server, also called TSM server, refreshing the blank first secure element 10. Any eGo secured element is registered within a first level TSM server. This TSM server is named eGo issuer TSM server. The eGo Issuer TSM server is in charge to contact, by using the user identification, e.g. user's email address, all eGo Issuer TSM servers to know if the user has already an eGo device registered. The eGo Issuer TSM server creates within the blank eGo secure element all Authority Secure Domains, as described in Global Platform standards, related to a second level of TSM servers named Authority TSM servers. All these Authority TSM servers are notified. Each Authority TSM server creates the Delegated Secure Domains within their Authority Secure Domains related to the given user and then notifies each Service Provider about the creation of the Delegated Secure Domain for a given user. The Service Provider clones the application of the user in the Delegate Secure Domain.

In another embodiment, the cloning phase is processed locally and the method comprises using a secure element 200 of a second trusted user 201 for the Two-factor authentication.

The backup secure element 11 is also in hands of the user 1. The cloning phase comprises establishing a secure channel between the first secure element 10 and the secure element 200 of the second trusted user 201.

In this embodiment, the method comprises preregistering biometric data of the user 1 on the secure element 200 of said second trusted friend 201 before processing the cloning phase.

The cloning phase comprises capturing biometric data such as the fingerprint of the user on the first secure element 10 and on the secure element 200 of said second trusted user 201, and in that it further comprises the step of authorizing the cloning of the credentials of the backup secure element 11 of the user 1 into the first secure element 11 if biometric data captured on the first secure element 10 match with biometric data preregistered in the secure element 200 of the second trusted user 201.

The user for example captures her fingerprint on the secure elements 10 and the secure element 200 of the trusted friend 201. If there is a match between biometric data of the user on both secure elements, i.e. if the user's fingerprint matches with her fingerprint preregistered in the secure element 200 of the trusted user 201, then the two-authentication factors is valid and the blank first secure element 10 gets from the backup secure element 11 the least credentials to allow the connection to the TSM server refreshing the blank first secure element 10.

According to another embodiment, the method comprises processing the cloning phase remotely, wherein the backup secure element 11 of the user 1 for the two-factor authentication is a remote secure element.

The method comprises preregistering biometric data of the second trusted user 201 on the backup secure element 11 of the user 1 before processing the cloning phase.

The method comprises requesting an activation of the backup secure element 11 by said second trusted user 201, an identification data of said second trusted user 201, and requesting a remote pairing of said backup secure element 11 with the first secure element 10.

The method comprises capturing a biometric data as a fingerprint of the user on the first secure element 10, transferring said biometric data to the remote backup secure element 11, and authorizing the cloning if said biometric data match.

For doing so, biometric data of a trusted second user 201 as fingerprints of the friend are previously registered in the remote backup secure element 11. The user 1 for example activates the blank secure element 10 and captures her biometric data such as her fingerprint on the first secure element 10. The user 1 calls the second trusted user 201 and asks him to activate the remote backup secure element 11 owned by the user 1, to touch device containing a secure element such as the third secure element used in the preliminary phase, e.g., an eGo-ready mouse of a computer connected to the Internet. The second trusted user 201 then enters her email address so that to be able to identify the secure element 200 on the network.

The remote backup secure element 200 has limited functions as it is not activated by its legitimate owner. The user 1 then touches a device containing a secure element such as the fourth secure element used in the remote preliminary phase, as an eGo-ready mouse of a computer connected to the Internet. A wizard pops up on the computer displays a form to fill. The user 1 enters her email address. After the pairing of the secure elements, a secure channel is established between the first secure element 10 and the backup secure element 11.

The user 1 then captures her fingerprint on the first secure element 10. The fingerprint minutia captured on the blank first secure element is then transferred to the remote backup secure element 11. If the fingerprint matching is successful then the two-authentication factors is valid and the blank first secure element 10 gets from the remote backup secure element the credentials to allow the connection to the TSM server refreshing the blank first secure element 10.

It will be well understood that the trusted user 20 in the preliminary phase and the second trusted user 201 in the cloning phase can be a same or different trusted user. Thus when it is the same trusted user in both phases, it will be also well understood that the secure element 200 of the second trusted friend 201 in the cloning phase can be either the same secure element 20 used in the preliminary phase or a different secure element.

It is then possible to use this method in a non trustable environment and allow the recovery of digital credentials to a blank secure element and to check the authenticity of this blank secure element.

In another embodiment, the first and the second secure elements are not eGo devices. Devices using other technology such as Bluetooth, RFID, . . . are also used.

The invention claimed is:

1. A method for cloning a first secure element of a first body-coupling communication device from a backup secure element of a first user, said backup secure element comprising at least credentials of said first user, the method comprising:
 a preliminary phase of checking the authenticity of the first secure element of the first body-coupling communication device using a second secure element of a second body-coupling communication device belonging to a second user, which is a trusted user and is different from the first user, said second secure element being able to be paired with a third secure element of a third body-coupling communication device, comprising:
 activating the first secure element by the first user and capturing a biometric data of the first user on the first secure element before pairing the first and the second secure element with the third secure element;
 detecting the first secure element by the third secure element and transferring pairing data between the first and the second secure element so that the first secure element and the second secure element are able to communicate directly together by the first user and the second user touching together the third body-coupling communication device containing the third secure element;
 authenticating the first secure element by the second secure element;
 establishing a secure communication channel between the first and the second secure elements; and
 informing the first user on the authenticity of the first secure element by providing an authentication signal on the second secure element; and
 a cloning phase activated by the first user upon confirmation of the authenticity of the first secure element based on the authentication signal provided on the second secure element, comprising:
 a two-factor authentication of the user performed on the backup secure element by capturing biometric data of the user on the first secure element and the backup secure element, pairing the first secure element and the backup secure element, transferring said biometric data captured on the first secure element to the backup secure element; and
 upon biometric data match, authorizing the cloning including copying said credentials of the first user from the backup secure element to the first secure element.

2. The method according to claim 1, wherein the preliminary phase comprises using the backup element of the first user as second secure element.

3. The method according to claim 1, wherein the preliminary phase comprises using the backup element of the first user as second secure element and further comprises a step of preregistering biometric data of a trusted user on the second secure element.

4. The method according to claim 1, wherein the method comprises establishing a secure channel between the first secure element and the backup secure element.

5. The method according to claim 1, wherein the method comprises processing the cloning phase locally and using a secure element of a second trusted user for the two-factor authentication.

6. The method according to claim 5, wherein the method comprises preregistering biometric data of the user on the secure element of said second trusted user before processing the cloning phase.

7. The method according to claim 5, wherein the method comprises establishing a secure communication channel between the first secure element and the secure element of the second trusted user.

8. The method according to claim 5, wherein the cloning step comprises capturing biometric data of the first user on the first secure element and the secure element of said second trusted user, and in that the method further comprises the step of authorizing the cloning of the credentials of the backup secure element of the first user into the first secure element if biometric data captured on the first secure element match with biometric data preregistered in the secure element of the second trusted user.

9. The method according to claim 1, wherein the method comprises processing the cloning phase remotely, wherein the backup secure element of the first user for the two-factor authentication is a remote secure element.

10. The method according to claim 9, wherein the method comprises preregistering biometric data of a second trusted user on the backup secure element of the first user before processing the cloning phase.

11. The method according to claim 9, wherein the method comprises requesting an activation of the backup secure element by a second trusted user, an identification data of said second trusted user, and a remote pairing of said backup secure element with the first secure element.

12. The method according to claim 9, wherein the method comprises capturing biometric data of the first user on the first secure element, transferring said biometric data to the remote backup secure element, and authorizing the cloning if said biometric data match.

* * * * *